United States Patent
Benicewicz et al.

(10) Patent No.: US 9,806,365 B2
(45) Date of Patent: Oct. 31, 2017

(54) METHODS OF PURIFYING A HYDROGEN GAS STREAM CONTAINING HYDROGEN SULFIDE IMPURITIES

(71) Applicants: Brian Benicewicz, Columbia, SC (US); Guoqing Qian, Irmo, SC (US)

(72) Inventors: Brian Benicewicz, Columbia, SC (US); Guoqing Qian, Irmo, SC (US)

(73) Assignee: University of South Carolina, Columbia, SC (US)

( * ) Notice: Subject to any disclaimer, the term of this patent is extended or adjusted under 35 U.S.C. 154(b) by 338 days.

(21) Appl. No.: 14/481,163

(22) Filed: Sep. 9, 2014

(65) Prior Publication Data

US 2015/0255818 A1    Sep. 10, 2015

Related U.S. Application Data

(60) Provisional application No. 61/875,324, filed on Sep. 9, 2013.

(51) Int. Cl.
| | |
|---|---|
| *B01D 53/32* | (2006.01) |
| *C25B 1/10* | (2006.01) |
| *H01M 8/0662* | (2016.01) |
| *C01B 3/50* | (2006.01) |
| *B01D 53/22* | (2006.01) |

(52) U.S. Cl.
CPC ........ *H01M 8/0681* (2013.01); *B01D 53/326* (2013.01); *C01B 3/503* (2013.01); *C01B 3/505* (2013.01); *C25B 1/10* (2013.01); *B01D 53/22* (2013.01); *B01D 2255/1021* (2013.01); *B01D 2255/1023* (2013.01); *B01D 2255/1026* (2013.01); *B01D 2255/20753* (2013.01); *B01D 2256/16* (2013.01); *B01D 2257/102* (2013.01); *B01D 2257/11* (2013.01); *B01D 2257/304* (2013.01); *B01D 2257/406* (2013.01); *B01D 2257/504* (2013.01); *B01D 2257/7022* (2013.01); *B01D 2257/7025* (2013.01); *B01D 2257/80* (2013.01); *Y02C 20/20* (2013.01); *Y02P 20/152* (2015.11); *Y02P 20/156* (2015.11)

(58) Field of Classification Search
CPC ............ B01D 53/326; C25B 1/10; C25B 1/12
See application file for complete search history.

(56) References Cited

U.S. PATENT DOCUMENTS

| | | | | |
|---|---|---|---|---|
| 2003/0196893 | A1* | 10/2003 | McElroy | C25B 1/02 204/266 |
| 2004/0028965 | A1* | 2/2004 | McElroy | H01M 8/04201 429/413 |
| 2004/0211679 | A1* | 10/2004 | Wong | B01D 53/326 205/765 |
| 2006/0065520 | A1* | 3/2006 | Ballantine | H01M 8/0612 204/279 |

(Continued)

*Primary Examiner* — Nicholas A Smith
(74) *Attorney, Agent, or Firm* — Dority & Manning, PA

(57) ABSTRACT

Methods for purifying a hydrogen gas stream are provided that can include: introducing the hydrogen gas stream into the hydrogen pumping cell, and collecting a purified hydrogen gas from the hydrogen pumping cell. The hydrogen gas stream can include hydrogen sulfide in an amount of about 10 ppm to about 1,000 ppm, and can have a relative humidity of about 0.1% or more at the operational temperature and pressure of the hydrogen pumping cell.

16 Claims, 4 Drawing Sheets

(56) References Cited

U.S. PATENT DOCUMENTS

2010/0243475 A1* 9/2010 Eisman ............... B01D 53/228
 205/763
2012/0148929 A1* 6/2012 Jia .................... H01M 8/04089
 429/429

* cited by examiner

METHODS OF PURIFYING A HYDROGEN GAS STREAM CONTAINING HYDROGEN SULFIDE IMPURITIES

PRIORITY INFORMATION

The present application claims priority to U.S. Provisional Patent Application Ser. No. 61/875,324 titled "Method of Purifying Hydrogen Containing Hydrogen Sulfide Impurities" of Benicewicz, et al. filed on Sep. 9, 2013, the disclosure of which is incorporated by reference herein.

GOVERNMENT SUPPORT CLAUSE

This invention was made with government support under W91CRB-10-1-007 awarded by DARPA/Office of Naval Research. The government has certain rights in the invention.

BACKGROUND

Hydrogen is an important gas for industrial applications, and as a fuel for fuel cell devices. Any hydrocarbon fuel that contains sulfur containing impurities (e.g. diesel, military strategic fuels, jet fuel, etc.) and that is used to produce hydrogen will convert the sulfur impurities to hydrogen sulfide. Hydrogen sulfide acts as a poison to fuel cell catalysts, and must be removed prior to use in fuel cells or in many industrial applications.

Fuel cells based on solid polymer electrolyte membranes (PEM) have attracted much recent attention due to their promise as energy conversion devices for portable, stationary, and transportation applications. Currently, most PEM fuel cells utilize perfluorosulfonic acid polymer membranes, such as Nafion. This type of membrane is typically operated below 100° C., due mainly to the complex water dynamics within the membrane. Additional technical challenges such as dimensional stability, low mechanical strength, and chemical degradation by peroxide radicals require additional and costly engineering solutions and control strategies. Phosphoric acid doped polybenzimidazoles (PBI) as membranes for high temperature polymer electrolyte membrane fuel cells (PEMFC) show distinct advantages such as high cell operation temperature (between 120° C. and 200° C.), high fuel impurity tolerance, no need for water management, and highly efficient waste heat usage.

Most PEMFCs use hydrogen as the preferred fuel gas and operate on the hydrogen rich gases reformed from other fuel sources. The reformation of other fuels into a hydrogen rich gas will likely contain carbon monoxide (CO) and hydrogen sulfide ($H_2S$) as key fuel gas impurities that could affect the fuel cell performance due to the high sensitivity of platinum catalysts to these fuel impurities. Low temperature PEM systems showed extremely high sensitivity to these fuel impurities, the operational limit of these impurities is at ppm and sub-ppb level for CO and $H_2S$, respectively. Therefore, it is required to remove these fuel impurities from anode feed gas streams, which usually rely on scrubbing technologies. The gas composition of a "clean" stream (from reformation of Navy strategic fuels such as jet fuel and removal of fuel impurities by scrubbing technologies) and the actual concentration levels of the variable components are summarized in Table 1. Similar or higher concentrations of hydrogen sulfide would be expected for high sulfur diesel fuels and other heavy hydrocarbon fuels.

TABLE 1

The composition of "clean" gas stream from Navy reformates.

| Gas type | Concentration (%) (Clean stream) | Highest concentration (%) of the variable components |
|---|---|---|
| $H_2$ | 41.6 | |
| $CH_4$ | 0.1 | |
| $N_2$ | 34.7 | |
| $CO_2$ | 0.035 | 7.7 |
| $H_2O$ | 23.5 | |
| CO | $10^{-3}$ (10 ppm) | 10 |
| $H_2S$ | $5 \times 10^{-8}$ ($5 \times 10^{-4}$ ppm) | $2.36 \times 10^{-3}$ (23.6 ppm) |

High temperature PBI-based fuel cells showed excellent tolerance to CO (up to 2%) at typical operational temperatures (i.e., 160° C. to 180° C.), but the fuel cell performance was very sensitive to the CO content at lower operational temperatures (i.e., 140° C. to 120° C.). However, PBI-based fuel cells showed good tolerance to 0.5 ppm $H_2S$ and limited tolerance to 25 ppm $H_2S$ at temperatures from 120° C. to 180° C.

A hydrogen purification technique, termed electrochemical hydrogen pumping, was developed, originally in the 1960s based on low-temperature PEMs. Fundamentally, an electrochemical pump is designed to oxidize and reduce hydrogen at the anode and cathode, respectively in an electrolytic mode. The concept is simple, requires little power, and has been shown to pump hydrogen to high pressures. However, the original work based on low temperature PEMs was constrained by the same gas purity requirements that are imposed on today's low temperature PEMFCs, i.e., the hydrogen stream was not processable if it contained trace amount of CO and/or $H_2S$. High temperature PBI-based electrochemical hydrogen pumping has been developed by H2PUMP, LLC.

As such, a need exists for a method of operating a high temperature PBI-based electrochemical hydrogen pump to purify a hydrogen gas stream with high concentration of hydrogen sulfide.

SUMMARY

Objects and advantages of the invention will be set forth in part in the following description, or may be obvious from the description, or may be learned through practice of the invention.

Methods are generally provided for purifying a hydrogen gas stream. In one embodiment, the method comprises: introducing the hydrogen gas stream into the hydrogen pumping cell, and collecting a purified hydrogen gas from the hydrogen pumping cell. In particular embodiments, the hydrogen gas stream includes hydrogen sulfide in an amount of about 10 ppm to about 1,000 ppm (e.g., of about 15 ppm to about 500 ppm), and has a relative humidity of about 0.1% or more (e.g., about 0.1% to about 10%, such as about 1.5% to about 5%) at the operational temperature and pressure of the hydrogen pumping cell. For example, the hydrogen pumping cell can be operated at a temperature of about 140° C. to about 200° C. and/or at a pressure of about 0 PSI to about 300 PSI. The purified hydrogen gas collected from the method has, in one embodiment, less than 10 ppm of any impurity.

The hydrogen pumping cell can include an anode and a cathode, such that the hydrogen gas stream is introduced to the anode and the purified hydrogen gas is collected from the cathode. A membrane can be positioned between the anode and the cathode. A catalyst can be positioned on either surface of the membrane and/or the anode and/or the cathode. The hydrogen pumping cell can be operated at a current density of about 0.1 A/cm$^2$ to about 0.6 A/cm$^2$.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for purifying hydrogen from a hydrogen containing gas stream that has hydrogen sulfide impurities. In particular, methods of purifying hydrogen in the presence of high concentrations of hydrogen sulfide impurities using a hydrogen pumping cell are generally provided. For example, methods are provided for operating a high temperature PBI-based electrochemical hydrogen pump to purify a hydrogen gas stream with high concentration of hydrogen sulfide (e.g., more than about 50 ppm).

Figure 4:
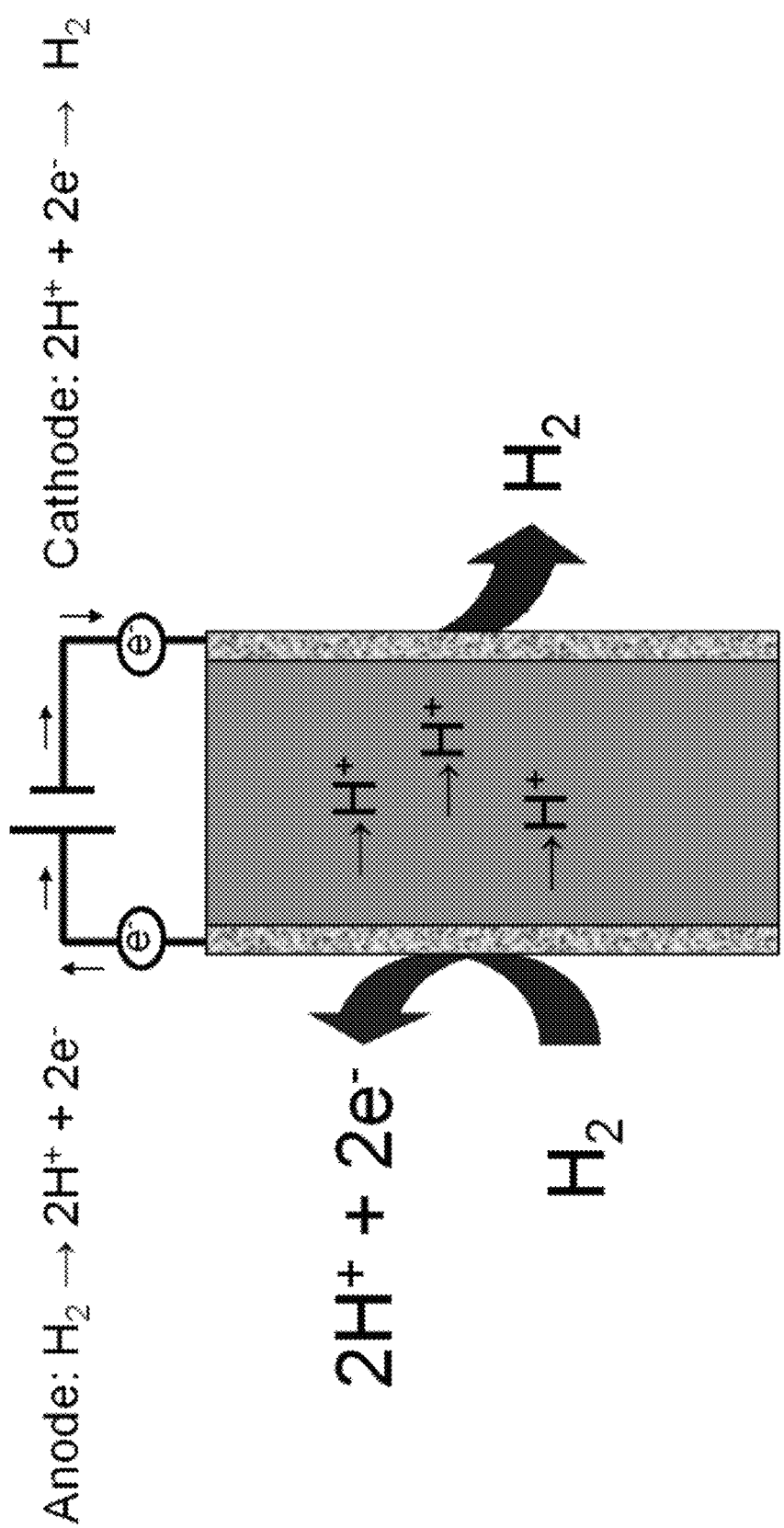
FIG. 4 shows a diagram of an exemplary hydrogen pump cell in operation.

Referring to FIG. 4, a schematic of an exemplary hydrogen pump cell is generally shown in operation. In the electrochemical process diagrammed, a hydrogen gas stream is introduced into the anode (inlet) chamber of the cell where a hydrogen gas molecule (i.e., H$_2$) is converted to two protons (2H$^+$) and two electrons (2e$^-$) through the action of a catalyst (e.g., a platinum catalyst) on the surface of the membrane. A power supply provides the electrical potential to drive the electrons from the anode to the cathode. The electrons and protons recombine in the cathode chamber to produce pure (new) H$_2$ gas molecule.

Particularly suitable catalysts for inclusion on the surface of the membrane in the electrodes of the hydrogen pumping cell can include, but are not limited to, platinum, palladium, ruthenium, nickel, or alloys thereof, or mixtures thereof.

The hydrogen gas stream can include hydrogen in an amount of about 20% to less than 100% by volume (e.g., about 50% to about 99.999% by volume), with additional gasses (e.g., nitrogen, carbon dioxide, helium, argon, water vapor, etc.) and impurities (e.g., H$_2$S, Co, NH$_3$, CH$_4$ or other volatile hydrocarbons such as ethane, etc.) present.

However, impurities do not pass through the membrane. As such, the purified hydrogen gas collected from the cathode is substantially free from any impurity, including H$_2$S. For example, the purified hydrogen gas can contain, in one embodiment, less than 10 ppm of any impurity, such as less than 1 ppm of any impurity.

This hydrogen pumping process operates like a fuel cell in that molecular hydrogen enters the anode compartment, is oxidized to protons and electrons at the catalyst surface, and then the protons are conducted through the membrane to the cathode while the electrons are driven through the electrically conductive elements of the cell to the cathode. Once the protons and electrons meet at the cathode, they recombine to form molecular hydrogen. Thus, hydrogen can be pumped and purified in a single step with a non-mechanical device.

By varying the relative humidity of feed gas, the hydrogen pump can purify the hydrogen containing less than 10 ppm to more than 1,000 ppm H$_2$S (e.g., about 10 ppm to about 1,000 ppm, such as about 25 ppm to about 500 ppm).

Of particular advantage, the presently described hydrogen pumping cell can be operated at a temperature of about 140° C. to about 200° C. and/or at a pressure of about 0 PSI to about 300 PSI. In certain embodiments, the operation current density range can be up to 0.6 A/cm$^2$ (e.g., about 0.1 A/cm$^2$ to about 0.6 A/cm$^2$).

Additionally, the hydrogen gas stream can have a relative humidity of about 0.1% to about 10% at the operational temperature and pressure of the hydrogen pumping cell (e.g., a relative humidity of about 1.5% to about 5% at the operational temperature and pressure of the hydrogen pumping cell). Without wishing to be bound by any particular theory, it is believed that the presence of water molecules slows, inhibits, and/or prevents poisoning of the catalyst by the H$_2$S molecules in the hydrogen gas stream. To this end, water molecules can be, in one embodiment, introduced into the hydrogen gas stream and/or the hydrogen pumping cell to adjust the relative humidity of the hydrogen gas stream reaching the hydrogen pumping cell. As such, the relative humidity of the hydrogen gas stream can be adjusted as desired (e.g., to be about 0.1% to about 10% operational temperature and pressure of the hydrogen pumping cell, such as about 1.5% to about 5%).

EXAMPLES

It was shown that varying the relative humidity of feed gas, the hydrogen pump can purify the hydrogen containing 500 ppm H$_2$S to less than 10 ppm (our microGC detection limit), and the operation current density range can be up to 0.6 A/cm$^2$. A stable and continuous 550 hours operation with 500 ppm H$_2$S was shown.

1. Hydrogen Pump Tolerance to H$_2$S

Hydrogen pump tolerance to H$_2$S was tested in a standard 50 cm$^2$ single cell with a Celtec-P1000 MEA (active area: 45.15 cm$^2$) from BASF Fuel Cell Inc. The feed gas was hydrogen with H$_2$S concentration varied from 50 ppm to 450 ppm. The relative humidity of the feed gases was controlled at a constant value of 0.43% RH.

Figure 1:
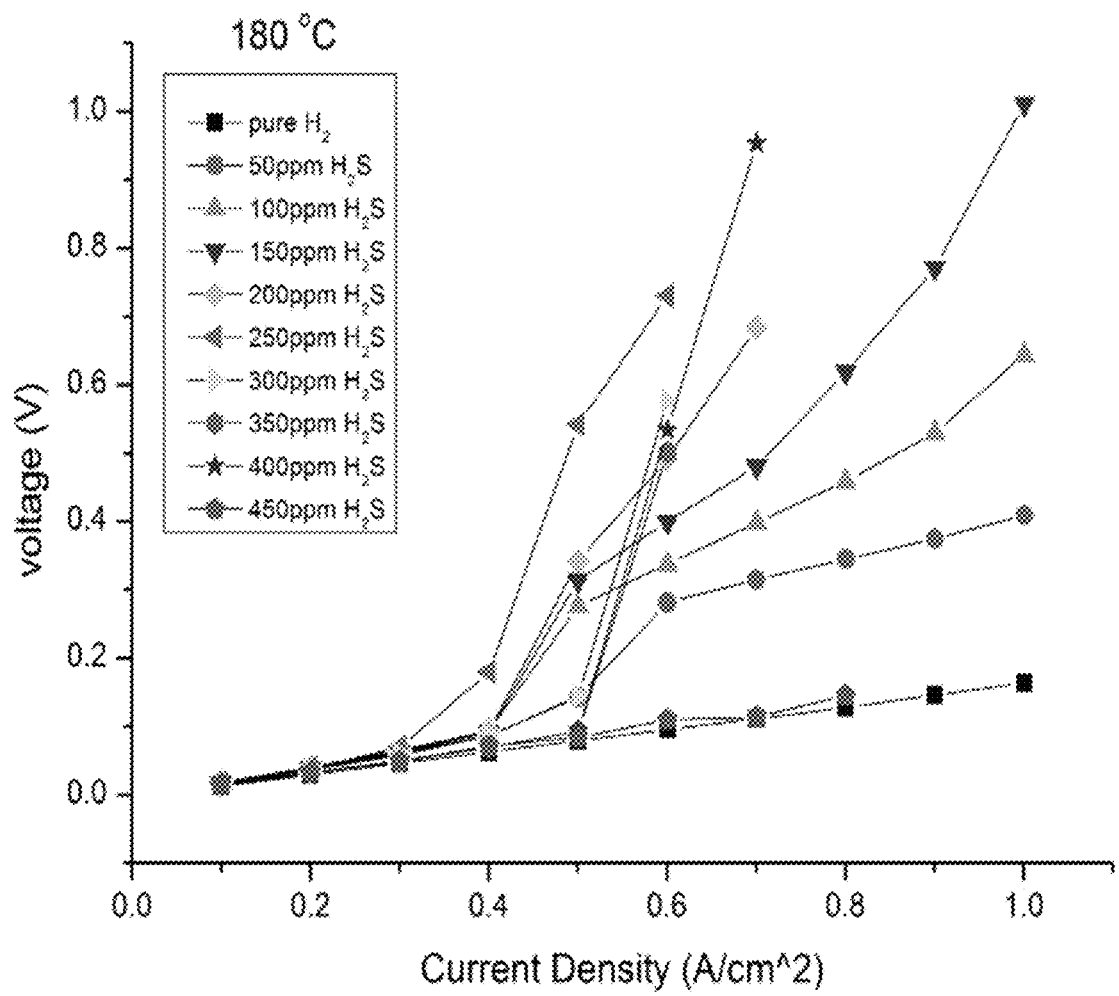
FIG. 1 shows the polarization curves for pure hydrogen and H$_2$ with H$_2$S at varying concentrations at 180° C. at 0.43% RH, according to the Examples.

FIG. 1 shows the polarization curves of a $H_2$ pump with pure hydrogen and $H_2$ with $H_2S$ at varying concentrations at 180° C. With the introduction of $H_2S$ (even as low as 50 ppm), the polarization curves started to deviate from the linear line at high current densities. The starting point of this deviation (current density) became smaller, which narrowed the pump operation range, when the $H_2S$ concentration increased from 50 ppm up to 250 ppm. Above 250 ppm, increasing the $H_2S$ concentration in the feed gases resulted in a decreased voltage at the higher current densities. At 450 ppm $H_2S$, the polarization curve is almost identical to the neat hydrogen polarization curve.

2. Effect of Relative Humidity on the Hydrogen Pump

Figure 2:
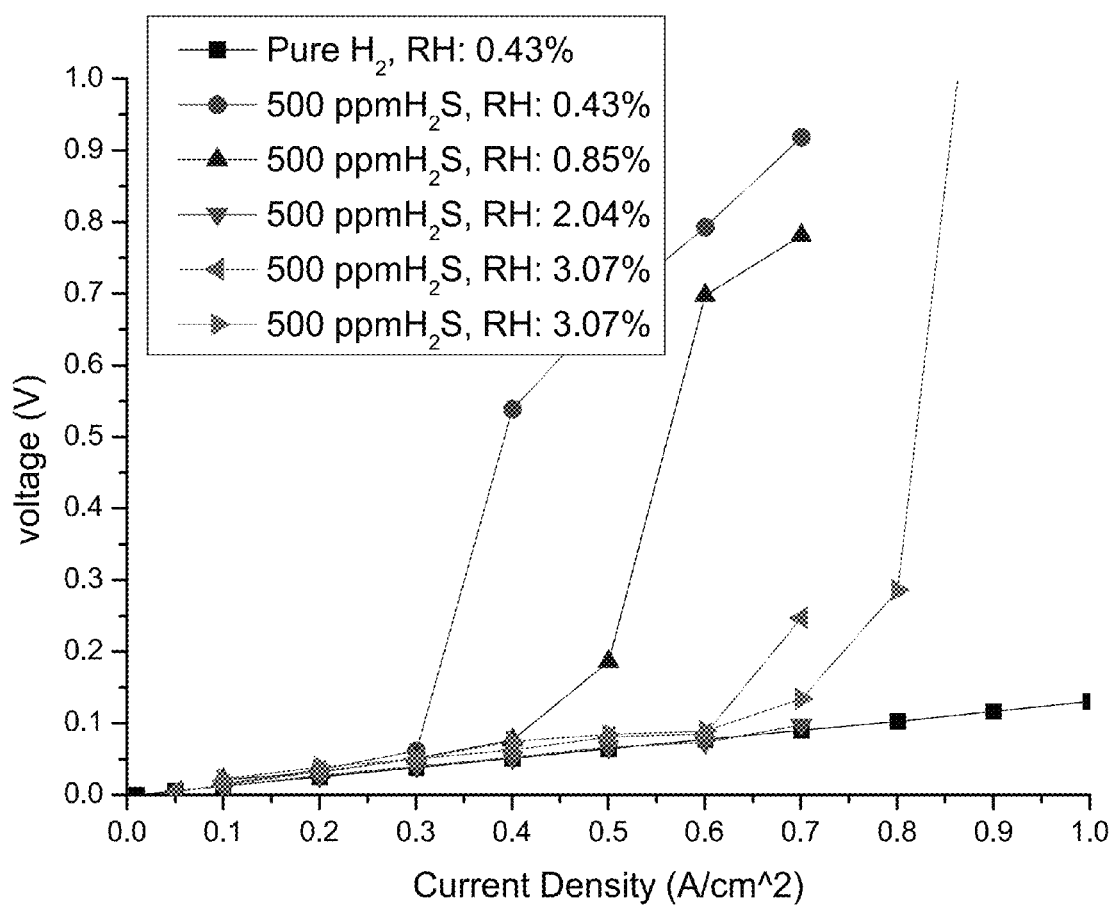
FIG. 2 shows the effect of relative humidity in feed gases on H$_2$ pump polarization at 180° C., according to the Examples.

The relative humidity effect on hydrogen pump performance was investigated by using a standard 50 cm$^2$ single cell with standard Celtec-P1000 MEA (active area: 45.15 cm$^2$) from BASF Fuel Cell Inc. The feed gas was hydrogen with 500 ppm of $H_2S$, and the relative humidity level of the feed gases was varied at 180° C. to characterize its effect on hydrogen pump tolerance to $H_2S$, and the results are shown in FIG. 2. The results showed that increasing the relative humidity significantly increased the current density at which the pump could operate before high over potentials were observed.

The purity of the hydrogen produced in FIG. 2 was measured by a micro GC (gas chromatrograph) and the $H_2S$ concentration was below the detection limit of the device, i.e., <10 ppm.

3. Long Term Hydrogen Pump Performance Test

Figure 3:
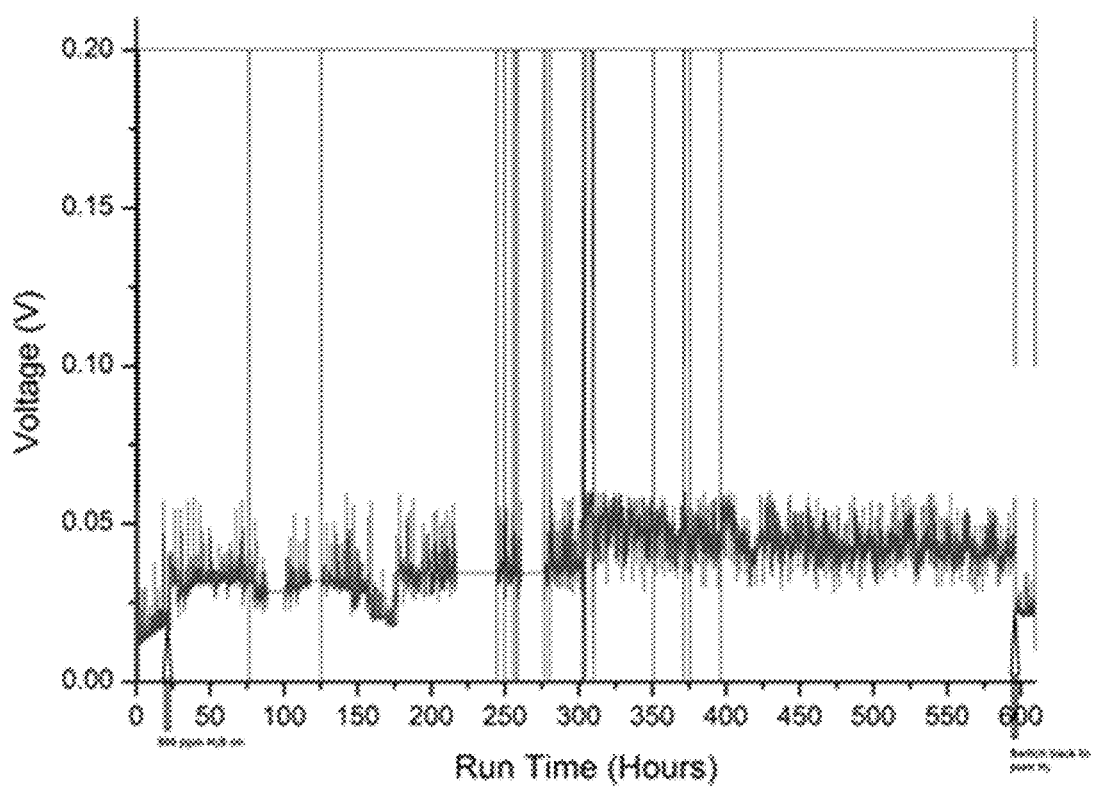
FIG. 3 shows the long term hydrogen pump performance with H$_2$/500 ppm hydrogen sulfide at 180° C. at 0.2 A/cm$^2$ with 0.43% relative humidity, according to the Examples.

A long term hydrogen pump performance test was conducted using a standard 50 cm$^2$ single cell with standard Celtec-P1000 MEA (active area: 45.15 cm$^2$) from BASF Fuel Cell Inc. As shown in FIG. 3, the cell was switched to hydrogen with 500 ppm $H_2S$ (RH 0.43%) after break-in and tested at constant current density 0.2 A/cm$^2$ for 550 hours. The hydrogen pump shows the stable performance and high reliability. The cell was switched back to neat $H_2$ (relative humidity 0.43%) at 580 hours, and the performance returned to values observed before the introduction of the $H_2S$.

4. Operating a Hydrogen Pump Containing High Levels of Hydrogen Sulfide

The ability to operate a hydrogen pump containing high levels of hydrogen sulfide was investigated by using a standard 50 cm$^2$ single cell with standard Celtec-P1000 MEA (active area: 45.15 cm$^2$) from BASF Fuel Cell Inc. The feed gas was hydrogen containing 750 ppm of $H_2S$, and the relative humidity level of the feed gas was 1.1% and the pump was operated at 180° C. to characterize its effect on hydrogen pump tolerance to $H_2S$. The results showed that the pump could operate stably at 0.4 A/cm$^2$ at a voltage of only 50 mV.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of purifying a hydrogen gas stream, the method comprising:
   operating a hydrogen pumping cell at a current density of about 0.1 A/cm$^2$ to about 0.6 A/cm$^2$ with the hydrogen gas stream flowing into the hydrogen pumping cell, wherein the hydrogen gas stream comprises hydrogen sulfide in an amount of about 10 ppm to about 1,000 ppm;
   introducing water molecules into the hydrogen gas stream and/or the hydrogen pumping cell to adjust the relative humidity of the hydrogen gas stream reaching the hydrogen pump cell, wherein the hydrogen gas stream has a relative humidity of about 0.1% to about 10% at the operational temperature and pressure of the hydrogen pumping cell; and
   collecting a purified hydrogen gas from the hydrogen pumping cell.

2. The method of claim 1, wherein the hydrogen pumping cell is operating at a temperature of about 140° C. to about 200° C.

3. The method of claim 1, wherein the hydrogen pumping cell is operating at a pressure of about 0 PSI to about 300 PSI.

4. The method of claim 1, wherein the hydrogen gas stream comprises hydrogen sulfide in an amount of about 15 ppm to about 500 ppm.

5. The method of claim 1, wherein the relative humidity of the hydrogen gas stream is about 1.5% to about 5% at the operational temperature and pressure of the hydrogen pumping cell.

6. The method of claim 1, wherein the hydrogen gas stream comprises hydrogen in an amount that is about 20% to less than 100% by volume.

7. The method of claim 1, wherein the purified hydrogen gas contains less than 10 ppm of any impurity.

8. The method of claim 1, wherein the hydrogen pumping cell comprises an anode and a cathode.

9. The method of claim 8, wherein the hydrogen gas stream is introduced to the anode.

10. The method of claim 8, wherein the purified hydrogen gas is collected from the cathode.

11. The method of claim 8, wherein the hydrogen pump cell comprises a membrane positioned between the anode and the cathode.

12. The method of claim 11, wherein a catalyst is positioned on a surface of the membrane facing the anode and the cathode.

13. The method of claim 12, wherein the catalyst comprises platinum.

14. The method of claim 13, wherein the catalyst comprises a platinum alloy.

15. The method of claim 12, wherein the catalyst comprises platinum, palladium, ruthenium, nickel, or alloys thereof.

16. The method of claim 1, wherein the relative humidity of the hydrogen gas stream is adjusted to be about 1.5% to about 5% operational temperature and pressure of the hydrogen pumping cell.

* * * * *